United States Patent
Kim

[19]

[11] Patent Number: 6,085,131
[45] Date of Patent: Jul. 4, 2000

[54] DRIVERLESS VEHICLE SYSTEM AND METHOD

[75] Inventor: Dong-Ho Kim, Ulsan, Rep. of Korea

[73] Assignee: Hyundai Motor Company, Ltd., Seoul, Rep. of Korea

[21] Appl. No.: 08/774,033

[22] Filed: Dec. 27, 1996

[30] Foreign Application Priority Data

Dec. 27, 1995 [KR] Rep. of Korea ..................... 95-58643

[51] Int. Cl.⁷ ............................. G01C 22/00; G05D 1/00
[52] U.S. Cl. ................................. 701/28; 701/23; 701/25; 180/168; 180/169; 318/587; 318/586; 348/118; 348/119
[58] Field of Search .................................. 701/23, 24, 28, 701/25, 26, 27; 348/82, 219, 148, 158, 211, 118, 119; 180/167, 168, 169; 318/587, 586

[56] References Cited

U.S. PATENT DOCUMENTS

| | | | |
|---|---|---|---|
| 4,063,283 | 12/1977 | Rider et al. .............................. | 358/107 |
| 4,819,169 | 4/1989 | Saitoh et al. ............................... | 701/23 |
| 5,109,425 | 4/1992 | Lawton ..................................... | 701/28 |
| 5,155,426 | 10/1992 | Kurami ..................................... | 701/28 |
| 5,163,002 | 11/1992 | Kurami ..................................... | 701/28 |
| 5,172,315 | 12/1992 | Asanuma et al. ......................... | 701/28 |
| 5,172,317 | 12/1992 | Asanuma et al. ......................... | 701/28 |
| 5,208,750 | 5/1993 | Kurami et al. ............................ | 701/28 |
| 5,307,419 | 4/1994 | Tsujino et al. ............................ | 701/28 |
| 5,339,241 | 8/1994 | Fujimori et al. .......................... | 701/27 |
| 5,414,625 | 5/1995 | Hattori ..................................... | 701/27 |
| 5,517,412 | 5/1996 | Unoura ..................................... | 701/23 |
| 5,555,019 | 9/1996 | Dole ........................................ | 348/148 |
| 5,623,244 | 4/1997 | Cooper ................................. | 340/425.5 |
| 5,652,617 | 7/1997 | Barbour .................................... | 348/85 |

*Primary Examiner*—Jacques H. Louis-Jacques

[57] ABSTRACT

The driverless vehicle system and method of control therefor includes a fixed camera fixedly mounted to a vehicle and a movable camera movably mounted to the vehicle. A control unit selectively inputs an image from one of the fixed camera and the movable camera, determines a trace angle based on the input image, and controls a steering angle of the vehicle based on the trace angle. The control unit also compares the trace angle to a first reference angle when the control unit inputs images from the fixed camera, and if the trace angle is greater than the first reference angle, the control means generates a desired angular position for the movable camera. A camera moving mechanism moves the movable camera to the desired angular position. Thereafter, the control means selects the movable camera from which to input images.

14 Claims, 3 Drawing Sheets

DRIVERLESS VEHICLE SYSTEM AND METHOD

BACKGROUND OF THE INVENTION

1. Field of the Invention

The present invention relates to a driverless vehicle system and method which utilizes a fixed and movable camera to monitor the road upon which the driverless vehicle system is travelling.

2. Description of Related Art

Various types of driverless vehicle systems are known in the art. Generally, conventional driverless vehicle systems utilize a fixed camera which takes images of the road upon which the vehicle is travelling. Using image recognition techniques, these conventional driverless vehicle systems identify road boundaries, obstacles, a desired travelling path, and a current vehicle travelling direction. Based on the desired travelling path and the direction in which the vehicle is travelling, the conventional driverless vehicle system calculates a tracing angle which is the angle between the desired travelling path and the vehicle's current travelling path. Based on the tracing angle, the steering angle of the vehicle can be controlled to eliminate the tracing angle.

U.S. Pat. No. 4,819,169 entitled SYSTEM AND METHOD FOR CALCULATING MOVEMENT DIRECTION AND POSITION OF AN UNMANNED VEHICLE to Saitoh et al., hereby incorporated by reference, discloses such a conventional driverless vehicle system. FIG. 3 illustrates the theory behind the driverless vehicle system of Saitoh. As shown in FIG. 3, Saitoh discloses a fixed camera 101 mounted on a vehicle 103. The camera 101 has a field of view defined by field of view boundary lines 109 and 111. The camera 101 is arranged such that the center line 105 of the field of view for the camera 101 coincides with the current travelling path of the vehicle. As disclosed in Saitoh, by using image recognition techniques, the road boundaries 200 and 300 can be determined. Based on the determination of road boundaries 200 and 300, a desired travelling path 107 is determined. The desired travelling path 107 is established by selectively choosing the distances W1 and W2 that the desired travelling path should lie from the road boundaries 200, 300. Having established the desired travelling path 107 and the current travelling path, the tracing angle θ is calculated. Based on the tracing angle θ, steering control is effected to eliminate the tracing angle in any well known manner.

As discussed above, conventional driverless vehicle systems such as disclosed by Saitoh only utilize a single fixed camera. Such driverless vehicle systems are limited to travelling on relatively straight or very gently curving roadways. If the conventional driverless vehicle system is used on a roadway having sharp curves, then the situation arises wherein one of the road boundaries 200, 300 will not lie within the field of view of the camera 101. In other words, because of a sharp curve in the roadway, one of the field of view boundary lines 109 and 111 will not intersect a corresponding one of the road boundaries 200, 300. As a result, the image taken by the camera 101 will not contain sufficient information for proper image recognition.

SUMMARY OF THE INVENTION

It is an object of the present invention to provide a driverless vehicle system and method which overcomes the disadvantages of the prior art.

It is a further object of the present invention to provide a driverless vehicle system and method which can travel on roadways having sharp curves.

It is another object of the present invention to provide a driverless vehicle system equipped with a fixed camera, and at least one movable camera.

These and other objectives are achieved by a method of controlling a driverless vehicle, comprising (a) inputting an image with a fixed camera, said fixed camera being fixedly mounted to a vehicle; (b) determining a tracing angle based on said image from said fixed camera, said tracing angle being an angle between a current traveling path of said vehicle and a desired traveling path of said vehicle; (c) determining whether said tracing angle is greater than a first reference angle; (d) rotating a movable camera, movably mounted to said vehicle, to a desired angular position based on said tracing angle when step (c) determines that said tracing angle is greater than said first reference angle; (e) inputting an image with said movable camera when step (c) determines that said tracing angle is greater than said first reference angle; (f) determining a tracing angle based on said image from said movable camera when step (c) determines that said tracing angle is greater than said first reference angle; and (g) controlling a steering angle of said vehicle based on said tracing angle determined in step (f) when step (c) determines that said tracing angle is greater than said first reference angle.

These and other objectives are further achieved by a driverless vehicle system, comprising a fixed camera fixedly mounted to a vehicle; a movable camera movably mounted to said vehicle; control means for selectively inputting an image from one of said fixed camera and said movable camera, for determining a trace angle based on said input image, and for controlling a steering angle of said vehicle based on said trace angle.

The objects of the present invention are still further achieved by a method of controlling a driverless vehicle, comprising (a) imaging a roadway using a fixed camera fixedly mounted to a vehicle; (b) imaging a roadway using a movable camera movably mounted to said vehicle; (c) selectively inputting an image from one of said fixed camera and said movable camera; (d) determining a trace angle based on said input image; and (e) controlling a steering angle of said vehicle based on said trace angle.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
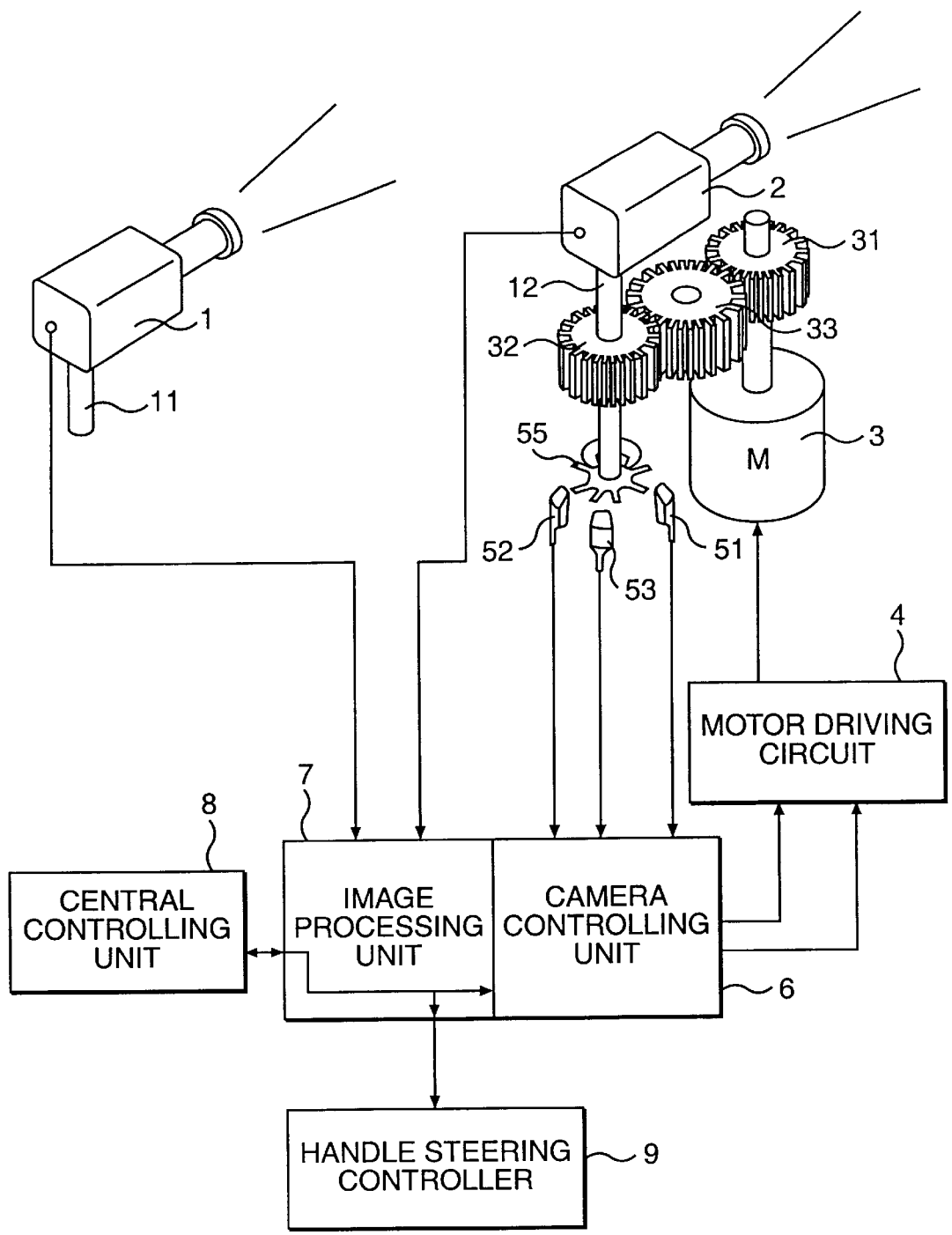
FIG. 1 illustrates the driverless vehicle system according to the present invention.

FIG. 1 illustrates the driverless vehicle system according to the present invention. As shown in FIG. 1, the driverless vehicle system according to the present invention includes a fixed camera 1 and a movable camera 2. The fixed camera 1 is mounted to a fixed shaft 11 in the same manner as the fixed camera 101 in conventional driverless vehicle systems.

The movable camera 2 is mounted to a rotary shaft 12. The rotary shaft 12 has a first gear 32 mounted thereon. The first gear 32 is in a gearing relationship with a second gear 33, and the second gear 33 is in a gearing relationship with a third gear 31. The third gear 31 is mounted on the shaft of a motor 3.

A toothed gear 55, mounted on the rotary shaft 12, and magnetic sensors 51, 52, and 53 form a conventional position sensor. As is well known in the art, the magnetic sensors 51–53 detect the passage of a tooth of gear 55, and based on the output pulses of the magnetic sensors 51–53, the position of the rotary shaft 12 can be established.

The driverless vehicle system according to the present invention further includes a motor driving circuit 4, camera controlling unit 6, image processing unit 7, central controlling unit 8, and handle steering controller 9. The image processing unit 7 selectively inputs the images taken by one of the fixed camera 1 and the movable camera 2. The image processing unit 7 digitizes these images, and sends the images to the central controlling unit 8. The central controlling unit 8 operates upon these images, and instructs the image processing unit 7 on whether subsequent images should be taken from either the fixed camera 1 or the movable camera 2. Additionally, the central controlling unit 8 outputs control signals to the camera controlling unit 6 regarding the desired position of the movable camera 2. Based on these instructions, the camera controlling unit 6 instructs the motor driving circuit 4 to drive the motor 3 such that the movable camera 2 achieves the desired position set forth by the central controlling unit 8. In moving the movable camera 2, the camera controlling unit 6 determines whether the movable camera 2 has reached the desired position based on the output of the magnetic sensors 51–53.

Based on the images received by the image processing unit 7, the central controlling unit 8 determines the tracing angle θ, and outputs that tracing angle θ to the handle steering controller 9 which then controls the steering of the driverless vehicle in any well known manner.

As will be readily appreciated by those skilled in the art, the motor driving circuit 4, the camera controlling unit 6, the image processing unit 7, the central controlling unit 8, and the handle steering controller 9 can be formed from a single microprocessor, or can be formed by a combination of hardwired logic and one or more microprocessors.

The operation of the driverless vehicle system will now be described with respect to FIG. 2.

Figure 2:
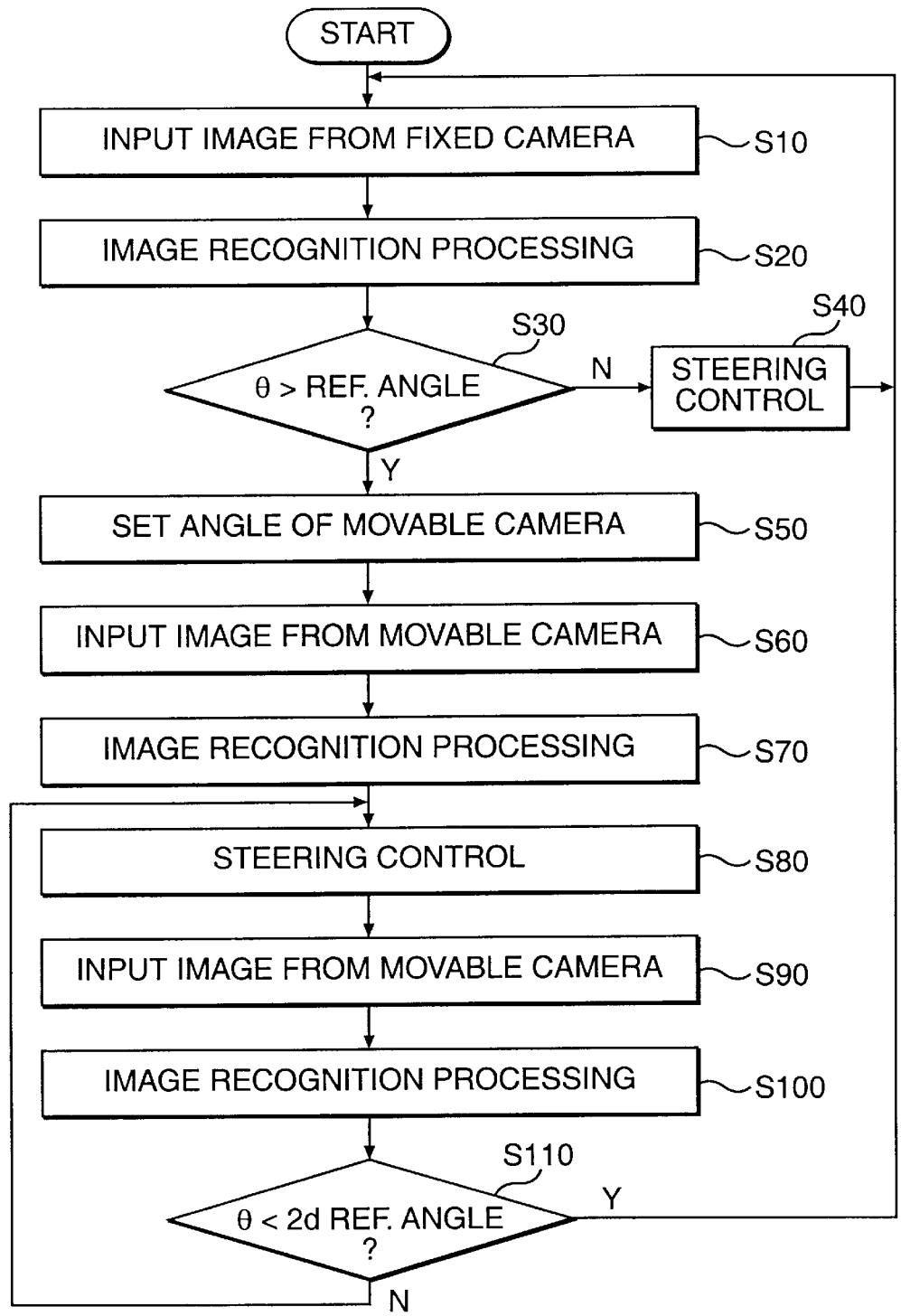
FIG. 2 illustrates the method for controlling the driverless vehicle system according to the present invention.
Figure 3:
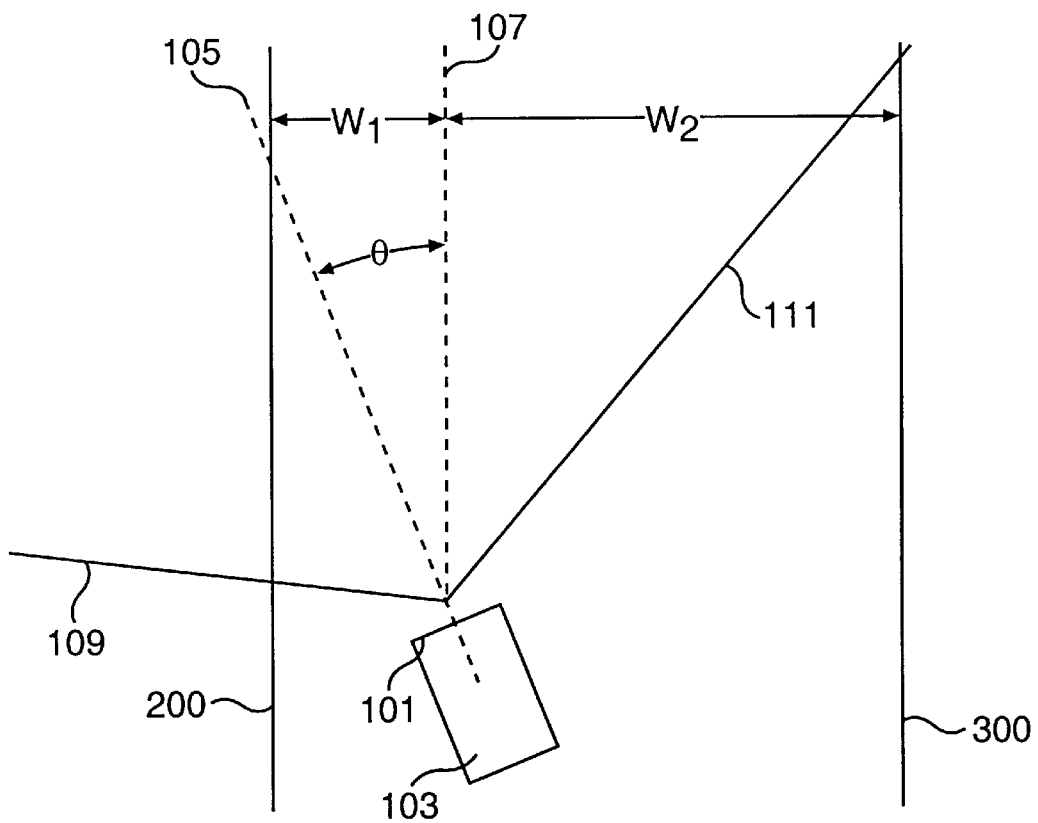
FIG. 3 is a schematic diagram for explaining the theory behind prior art driverless vehicle systems.

FIG. 2 illustrates the method for controlling the driverless vehicle system according to the present invention. When the control method begins, it is assumed that the driverless vehicle is positioned such that the current travelling path substantially coincides with the desired travelling path. Then, in step S10, the central controlling unit 8 instructs the image processing unit 7 to input the image from the fixed camera 1. Next, in step S20, the image processing unit 7 digitizes the image, and forwards the digitized image to the central controlling unit 8. The central controlling unit 8 then performs image recognition processing S20 on the input image in any well known manner such as described in U.S. Pat. No. 4,819,169.

As discussed above, a roadway may curve so sharply that the field of view of the fixed camera 1 will not contain sufficient information to perform the image recognition processing of step S20. Therefore, in step S30, the central controlling unit 8 determines whether or not the tracing angle θ is greater than a reference angle. The reference angle is chosen such that the field of view of the fixed camera 1 still provides sufficient information if the tracing angle equals the reference angle, but if the tracing angle increases much more than the reference angle, then the field of view of the fixed camera 1 will no longer contain sufficient information to perform image recognition processing. As one skilled in the art will readily appreciate, the reference angle can be established based on desired operating characteristics.

In step S30, if the tracing angle θ is not greater than the reference angle, then in step S40, the central controlling unit 8 outputs the tracing angle θ to the handle steering controller 9, and the handle steering controller 9 controls the steering of the vehicle in any well known manner. Processing then returns to step S10.

If, however, the tracing angle θ is greater than the reference angle, then processing proceeds to step S50. In step S50, the central controlling unit 8 outputs a desired angular position of the movable camera 2 with respect to fixed camera 1 (i.e. direction of vehicle travel). Based on the desired operating characteristics, the desired angular position of the camera 2 can be set such that the angle formed between the center lines of the field of view for the fixed camera 1 and the movable camera 2 equals the tracing angle θ, the reference angle, some angle therebetween, or the tracing angle θ plus some additional predetermined angle. Based on the desired angular position of the movable camera 2 output by the central controlling unit 8, the camera controlling unit 6 instructs the motor driving circuit 4 to rotate the camera in either a clockwise or counterclockwise direction to achieve the desired angular position. The camera controlling unit 6 then monitors the movement of the camera 2 based on the output of the magnetic sensors 51–53, and instructs the motor driving circuit 4 to stop rotating the movable camera 2 once the movable camera 2 has reached the desired angular position.

Once the movable camera 2 has reached the desired angular position, the camera controlling unit 6 outputs a signal to the central controlling unit 8 indicating that the desired angular position has been reached. Then, in step S60, the central controlling unit 8 instructs the image processing unit 7 to input an image taken by the movable camera 2. Next, in step S70, the image processing unit 7 digitizes the image input from the movable camera 2, and sends the digitized image to the central controlling unit 8. The central controlling unit 8 then performs image recognition processing in the same manner as step S20. In other words, based on the digitized image taken from movable camera 2, the central controlling unit 8 can again establish the road boundaries 200, 300 and the desired travelling path 107. Furthermore, because the central controlling unit 8 knows the angular difference between the center lines of the field of view of the fixed camera 1 and the movable camera 2 based on the known angular position of movable camera 2 with respect to fixed camera 1, the central controlling unit 8 can also establish the current travelling path of the vehicle; and thus, calculate the tracing angle θ.

In step S80, the central controlling unit 8 outputs the tracing angle θ to the handle steering controller 9, and the handle steering controller 9 performs steering control in any well known manner based on the tracing angle θ.

Then, in step S90, the central controlling unit 8 instructs the image processing unit 7 to input the image taken by the movable camera 2. Next, in step S100, the image processing unit 7 digitizes the image input from the movable camera 2, and sends the digitized image to the central controlling unit 8. The central controlling unit 8 then performs image recognition processing in the same manner as step S20.

Next in step S110, the central controlling unit 8 determines whether or not the tracing angle θ is less than a second reference angle. The second reference angle may be the same as the reference angle used in step S30, or may be a different reference angle. Both the reference angle of step S30 and the second reference angle may be set based on desired operating characteristics. If the tracing angle θ is not less than the second reference angle, then processing returns to step S80. If the tracing angle θ is less than the reference angle, then processing returns to step S10 wherein steering control is again performed based on the images taken by the fixed camera 1.

By switching between the fixed camera 1 and the movable camera 2, the driverless vehicle system of the present invention can travel on roads having sharp curves.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A method of controlling a driverless vehicle, comprising:
   (a) inputting a first image with a fixed camera, said fixed camera being fixedly mounted to a vehicle;
   (b) determining a tracing angle based on said image from said fixed camera, said tracing angle being an angle between a current traveling path of said vehicle and a desired traveling path of said vehicle;
   (c) determining whether said tracing angle is greater than a first reference angle;
   (d) rotating a movable camera, movably mounted to said vehicle, to a desired angular position based on said tracing angle when step (c) determines that said tracing angle is greater than said first reference angle;
   (e) inputting an image with said movable camera when step (c) determines that said tracing angle is greater than said first reference angle;
   (f) determining a new tracing angle based on said image from said movable camera when step (c) determines that said tracing angle is greater than said first reference angle; and
   (g) controlling a steering angle of said vehicle based on said new tracing angle determined in step (f) when step (c) determines that said tracing angle is greater than said first reference angle.

2. The method of claim 1, wherein said step (g) controls said steering angle of said vehicle based on said tracing angle determined in step (b) when step (c) does not determine that said tracing angle is greater than said first reference angle.

3. The method of claim 1, further comprising the following steps after said step (g),
   (h) inputting a second image with said movable camera when step (c) determines that said tracing angle is greater than said first reference angle;
   (i) determining a tracing angle based on said second image input in step (h);
   (j) determining whether said tracing angle determined in step (i) is less than a second reference angle;
   (k) returning to step (a) if step (j) determines that said tracing angle determined in step (i) is less than said second reference angle.

4. The method of claim 3, further comprising:
   (l) returning to step (g) if step (j) determines that said tracing angle determined in step (i) is not less than a second reference angle.

5. A driverless vehicle system comprising:
   a fixed camera fixedly mounted to a vehicle;
   a movable camera movably mounted to said vehicle;
   control means for selectively inputting an image from one of said fixed camera and said movable camera, for determining a trace angle based on said input image, and for controlling a steering angle of said vehicle based on said trace angle; and
   movable means for moving said movable camera to said desired angular position,
   wherein said control means compares said trace angle to a first reference angle when said control means inputs images from said fixed camera, and if said trace angle is greater than said first reference angle, said control means generates a desired angular position for said movable camera, and
   wherein said control means selects said movable camera from which to input an image after said movable means moves said movable camera to said desired angular position when said trace angle is greater than said first reference angle.

6. The driverless vehicle system of claim 5, wherein said movable means comprises:
   a rotary shaft upon which said movable camera is mounted;
   a motor;
   a gear arrangement transferring power generated by said motor to said rotary shaft to rotate said rotary shaft;
   position sensing means for sensing an angular position of said rotary shaft, said angular position of said rotary shaft corresponding to an angular position of said movable camera; and
   motor control means for controlling operation of said motor based on said sensed angular position of said rotary shaft such that said movable camera achieves said desired angular position.

7. The driverless vehicle system of claim 5, wherein said control means compares said trace angle to a second reference angle when said control means inputs images from said movable camera, and if said trace angle is less than said second reference angle, said control means selects said fixed camera from which to input an image.

8. A driverless vehicle system comprising:
   a fixed camera fixedly mounted to a vehicle;
   a movable camera movably mounted to said vehicle;
   control means for selectively inputting an image from one of said fixed camera and said movable camera, for determining a trace angle based on said input image, and for controlling a steering angle of said vehicle based on said trace angle; and movable means for moving said movable camera to a desired angular position, wherein said movable means comprises:
   a rotary shaft upon which said movable camera is mounted;
   a motor;
   a gear arrangement transferring power generated by said motor to said rotary shaft to rotate said rotary shaft;

position sensing means for sensing an angular position of said rotary shaft, said angular position of said rotary shaft corresponding to an angular position of said movable camera; and motor control means for controlling operation of said motor based on said sensed angular position of said rotary shaft such that said movable camera achieves said desired angular position.

9. A driverless vehicle system comprising:

a fixed camera fixedly mounted to a vehicle;

a movable camera movably mounted to said vehicle; and control means for selectively inputting an image from one of said fixed camera and said movable camera, for determining a trace angle based on said input image, and for controlling a steering angle of said vehicle based on said trace angle, wherein said control means compares said trace angle to a reference angle when said control means inputs images from said movable camera, and if said trace angle is less than said reference angle, said control means selects said fixed camera from which to input an image.

10. A method of controlling a driverless vehicle, comprising:

(a) imaging a roadway using a fixed camera fixedly mounted to a vehicle;

(b) imaging a roadway using a movable camera movably mounted to said vehicle;

(c) selectively inputting an image from one of said fixed camera and said movable camera;

(d) determining a trace angle based on said input image;

(e) controlling a steering angle of said vehicle based on said trace angle;

(f) comparing said trace angle to a first reference angle when step (c) inputs images from said fixed camera;

(g) generating a desired angular position for said movable camera if said trace angle is greater than said first reference angle; and (h) moving said movable camera to said desired angular position, wherein said step (c) selects said movable camera from which to input an image after said movable means moves said movable camera to said desired angular position when said trace angle is greater than said first reference angle.

11. The method of claim 10, further comprising:

(i) comparing said trace angle to a second reference angle when step (c) inputs images from said movable camera; and wherein said step (c) selects said fixed camera from which to input an image if said trace angle is less than said second reference angle.

12. A method of controlling a driverless vehicle, comprising:

(a) imaging a roadway using a fixed camera fixedly mounted to a vehicle;

(b) imaging a roadway using a movable camera movably mounted to said vehicle;

(c) selectively inputting an image from one of said fixed camera and said movable camera;

(d) determining a trace angle based on said input image;

(e) controlling a steering angle of said vehicle based on said trace angle; and (f) comparing said trace angle to a reference angle when step (c) inputs images from said movable camera, wherein said step (c) selects said fixed camera from which to input an image if said trace angle is less than said reference angle.

13. A driverless vehicle system comprising:

a fixed camera fixedly mounted to a vehicle;

a movable camera movably mounted to said vehicle; and control means for selectively inputting an image from one of said fixed camera and said movable camera, for determining a trace angle based on said input image, and for controlling a steering angle of said vehicle based on said trace angle, wherein the control means selectively input the image from one of said fixed and movable cameras based on a comparison between an angle derived from an image produced by at least one of those cameras and a threshold angle value.

14. A method of controlling the driverless vehicle comprising:

(a) imaging a roadway using a fixed camera fixedly mounted to a vehicle;

(b) imaging a roadway using a movable camera movably mounted to said vehicle;

(c) selectively inputting an image from one of said fixed camera and said movable camera;

(d) determining a trace angle based on said input image; and (e) controlling a steering angle of said vehicle based on said trace angle;

wherein the step of selectively inputting the image produced by one of said fixed and movable cameras includes:

deriving an angle from an image produced by at least one of said fixed and movable cameras;

comparing the derived angle to a threshold angle value; and selectively inputting the image produced by one of said fixed and movable cameras based on the comparison result.

* * * * *